(12) United States Patent
Goodman et al.

(10) Patent No.: US 6,427,238 B1
(45) Date of Patent: Jul. 30, 2002

(54) MODULE MANAGER FOR INTERACTIVE TELEVISION SYSTEM

(75) Inventors: Andrew Goodman, Menlo Park; Jean Rene Menand, Palo Alto, both of CA (US)

(73) Assignee: OpenTV, Inc., MountainView, CA (US)

( * ) Notice: Subject to any disclaimer, the term of this patent is extended or adjusted under 35 U.S.C. 154(b) by 0 days.

(21) Appl. No.: 09/087,269

(22) Filed: May 29, 1998

(51) Int. Cl.[7] .......................... H04N 7/16; H04N 7/173; H04N 7/025
(52) U.S. Cl. .................. 725/136; 725/132; 725/139; 725/142; 725/152; 348/552; 348/553
(58) Field of Search .................. 725/32, 132, 136, 725/137, 140, 152, 109–113, 131, 134, 139, 142, 9, 14; 348/552–553, 705–706

(56) References Cited

U.S. PATENT DOCUMENTS

| | | |
|---|---|---|
| 5,440,632 A | 8/1995 | Bacon et al. |
| 5,539,920 A * | 7/1996 | Menand et al. ............... 455/5.1 |
| 5,625,693 A | 4/1997 | Rohatgi et al. |

FOREIGN PATENT DOCUMENTS

| | | |
|---|---|---|
| EP | 0 399 200 | 11/1990 |
| EP | 0 752 786 | 1/1997 |
| WO | 97/30549 | 8/1997 |

OTHER PUBLICATIONS

International Search Report, Application No. PCT/US 99/11908, mailed Sep. 23, 1999.

* cited by examiner

*Primary Examiner*—Chris Grant
*Assistant Examiner*—Son P. Huynh
(74) *Attorney, Agent, or Firm*—Conley, Rose & Tayon, PC; Rory D. Rankin

(57) ABSTRACT

A system and method implemented in an interactive television system for managing modules of interactive television applications. The system transmits modules from a broadcast station to a plurality of receiving stations through various paths, such as broadcast channels and modem channels. The receiving stations have module managers which store module requests and which monitor the various channels for modules corresponding to the requests. When modules are transmitted on the monitored channels, they are matched with the corresponding stored requests. If a module matches one of the requests, or if is an auto-loading module, it is stored in the receiving station. If a module has not been requested and is not an auto-loading module, it is ignored. The stored modules are added to a list of modules available for execution or for use by an executing application, and the corresponding requests are deleted.

20 Claims, 4 Drawing Sheets

MODULE MANAGER FOR INTERACTIVE TELEVISION SYSTEM

BACKGROUND OF THE INVENTION

1. Field of the Invention

The invention relates to interactive television systems and more particularly to management of application modules which are delivered to an interactive television receiver.

2. Description of the Related Art

Interactive television systems enable television sets to be used to provide various new means for providing services to viewers. Interactive television systems are capable of displaying text and graphic images in addition to typical video program streams. Interactive television systems are also capable of registering viewer actions or responses. Proposed features of interactive television include a variety of marketing, entertainment and educational capabilities such as allowing a user to interact with televised programs by ordering advertised products or services, competing against contestants in a game show, or requesting specialized information regarding particular programs.

Typically, a broadcast service provider generates an interactive television signal for transmission to a viewer's television. The interactive television signal includes an interactive portion consisting of application code or control information, as well as an audio-video portion consisting of a television program. The broadcast service provider combines the audio-video and interactive portions into a single signal for transmission to a receiver connected to the user's television. The signal is generally compressed prior to transmission and transmitted through typical broadcast channels, such as cable television (CATV) lines or direct satellite transmission systems.

The interactive functionality of the television is controlled by a set-top box connected to the television. The set-top box receives the signal transmitted by the broadcast service provider, separates the interactive portion from the audio-video portion and decompresses the respective portions of the signal. The set-top box uses the interactive information to, for example, execute an application while the audio-video information is transmitted to the television. The set-top box may combine the audio-video information with interactive graphics or audio generated by the interactive application prior to transmitting the information to the television. The interactive graphics and audio may present additional information to the viewer or may prompt the viewer for input. The set-top box may provide viewer input or other information to the broadcast service provider via a modem connection.

Interactive television applications may consist of a set of program modules. The set of modules forming an application is typically self-contained in that all of the code needed by the application is in the set of modules. The first module is a directory module which identifies all of the modules which are part of the application. The entire set of modules, which is listed in the directory module, is transmitted via the broadcast channel to the set-top box and the application is executed. If a first interactive television application has completed execution and a second is to be executed, the directory and other modules of the second application are transmitted to the set-top box and the second application is executed. The entire set of modules used by the second application are transmitted even though some of the modules might be identical to modules used by the first application.

SUMMARY OF THE INVENTION

One of the advantages of designing software applications in a modular fashion is the ability to share modules between applications. The advantages of modularity may include conserving the limited amount of memory in a set-top box which can be used for interactive applications, reducing the time required to download applications from a broadcast station to a set-top box and reducing the amount of application code which must be written by allowing modules to be shared. The components of an application, however, may reside in different carousels (sets of modules, as described in more detail below) or in modules which may not be available at the time the application begins execution. It is therefore desirable to implement a system for management of the different modules. It would be advantageous for this management system to be capable of handling modules which have not yet been received and which may have to be extracted from an interactive television signal. Further, it would be advantageous for this management system to be capable of simultaneously monitoring several sources (e.g., a broadcast channel and a modem channel) for the modules needed by an application.

The invention comprises a system and method for managing modules of interactive television applications. One embodiment of the invention includes a set-top box configured with several input ports for receiving one or more interactive television signals which may embody the carousel modules. The interactive television signals typically comprise packets of compressed data corresponding to modules of an interactive television application, television programs, or other interactive television data. ("Television program" as used herein refers generally to any type of audio and/or video programming which is normally viewed on a television.) The various types of packets are generally time multiplexed with each other. The set-top box monitors the input ports to determine whether a packet received at the input port contains module data and, if so, whether the module should be processed and stored in the set-top box. If the system determines that the module should be stored, the packets corresponding to the module are extracted from the interactive television signal. When all of the packets corresponding to the module have been extracted from the interactive television signal, the module is processed and made available for execution.

If there is no interactive television application executing in the set-top box, the system monitors the input ports for auto-loading modules, such as application directory modules. When one of these application directory modules is detected, the system begins collecting packets containing data from the directory module. When all of these packets have been collected, the system reconstructs the directory module and authenticates it. The system then monitors the input ports for the carousel modules (i.e., those listed in the directory module,) stores the corresponding packets and reconstructs the modules for use by the application corresponding to the carousel.

The executing application may request modules which are not yet available in the set-top box. These requests are stored by the system, which monitors the input ports for the corresponding modules. The system collects the packets of these modules when they are detected at the input ports, then stores the modules. The system thus matches incoming modules with pending requests and makes the modules available for execution. The system may provide for modules which are in greater demand among subscribers of the system to be transmitted to all of the subscribers via a broadcast channel, while modules which are in less demand are transmitted to individual subscribers via a modem channel.

BRIEF DESCRIPTION OF THE DRAWINGS

Other objects and advantages of the invention will become apparent upon reading the following detailed description and upon reference to the accompanying drawings in which.

Figure 1:
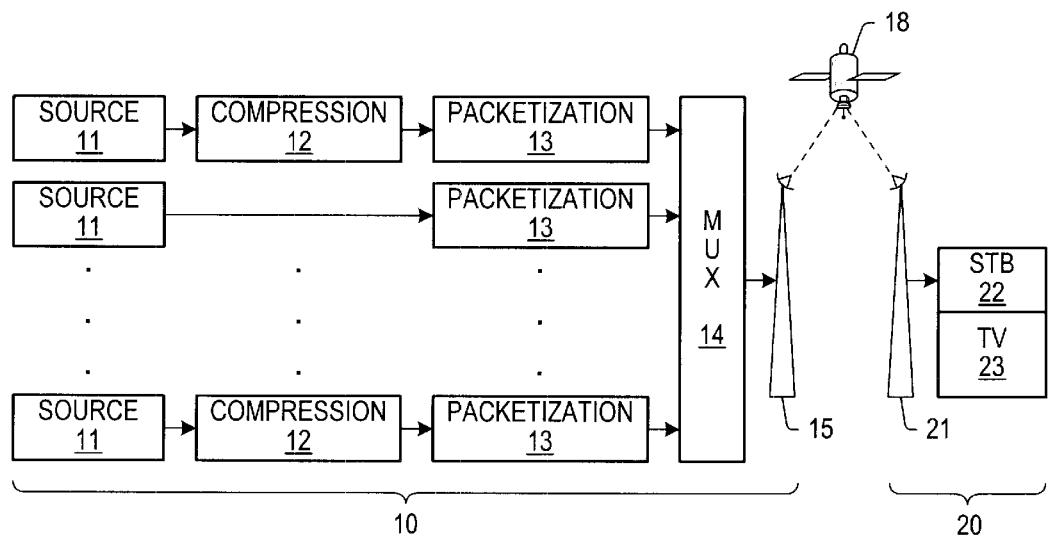
FIG. 1 is a block diagram illustrating the distribution of interactive television applications and television programs from their sources to a series of viewers.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

One embodiment of the invention is described below. In this embodiment, an interactive television receiver accepts an audio-video-interactive signal via a broadcast channel such as direct satellite transmission. ("Direct" satellite transmission as used herein contemplates transmissions received by the interactive television receiver, more particularly by its antenna, directly from the satellite.) The audio-video-interactive signal contains television programs or similar audio-video content, as well as interactive content such as control signals or interactive applications. ("Broadcast" is used herein to refer to transmission of a single signal to all subscribing receivers.) The interactive television receiver is also configured to receive signals via a modem channel. The signals transmitted via the broadcast and modem channels may both embody various modules. Each of these two channels is therefore considered a "module source" for the purposes of this description. The modules contained in the signals from the module sources may comprise components of an interactive application. The modules can contain any type of data, such as application code, raw data or graphical information. Because the modules are generally transmitted to the television receiver in a cyclic manner, the set of modules is often referred to as a carousel. (An application is a carousel which contains a "top-level" program.) A module manager is implemented in the system to control the manner in which the modules are requested by an application, received from the module sources and matched with the application requiring the modules.

If no application is executing in the system, the module manager monitors the module sources for modules which are auto-loading. The directory module of an interactive application, for example, may be auto-loading. If an application is executing in the system, the application may request modules. More particularly, it may request modules which are not part of the same carousel as the application. The module manager stores the application's requests and monitors the module sources for modules corresponding to the requests. When one of the requested modules is detected, the module manager stores it, makes it available to the executing application and removes the request from the module manager's request queue. If the module manager receives a module which has not been requested and which cannot be automatically loaded, the module is ignored (i.e., it is not stored in the system.)

Referring to FIG. 1, a block diagram illustrating the distribution of interactive television applications and television programs from their sources to a series of viewers is shown. Broadcast station 10 has several program sources 11. These sources may include remote broadcast network feeds, videotape recorders, computers, data storage devices, and the like. Sources 11 may provide interactive applications, control information or audio or video information which is to be included in the interactive television signal. The information provided by sources 11 is typically compressed by compression units 12 in order to conserve bandwidth. Any of a number of compression algorithms, such as one s of the Motion Picture Expert Group (MPEG) compression standards, may be used if appropriate for a particular program or application. Time stamps may also be added to, for example, synchronize associated audio and video signals. Some information may not be easily or effectively compressed, so some of the information may be routed directly from the source to packetization unit 13 without compressing the information. Packetization units 13 accept the compressed (or uncompressed) information and format it into packets for transmission over the broadcast channel. The packetization of the information will be described in more detail below. The packets are fed into multiplexing unit 14, which intersperses the packets prior to transmission. The interspersed packets are then broadcast to the receiving stations 20. (Although only one receiving station is shown in the figure, it is contemplated that the audio-video-interactive signal is broadcast to a group of subscribing receiving stations.) In the figure, the audio-video-interactive signal is depicted as being transmitted via satellite broadcast through antenna 15.

The broadcast signal is relayed by communications satellite 18 and received by receiving station 20. Although the figure illustrates a satellite transmission, it is contemplated that any broadcast medium (e.g., CATV or direct satellite transmission) may be used. Receiving station 20 is contemplated to be one of a number of such stations which are subscribers of the broadcast service provider operating broadcast station 10. The broadcast signal is collected by receiving antenna 21 and fed to receiver 22, which in this embodiment is contemplated to be a set-top box. Set-top box 22 processes the packetized signal to reconstruct the television programs and interactive applications embodied in the signal. The reconstructed applications are executed in the set-top box, while the reconstructed television programs are passed to the television, where they are displayed. The interactive applications may generate graphics or audio which are combined with the television program prior to being displayed.

In addition to the broadcast channel between the broadcast station and receiving station, there may be other channels, such as a modem channel (which may also be referred to as an http, or hypertext transfer protocol, channel.) These types of channels serve two functions in the system: they allow the set-top box to provide feedback to the broadcast station; and they provide an alternate path for programs and applications from sources 12 to be delivered to receiving station 20.

Figure 2:
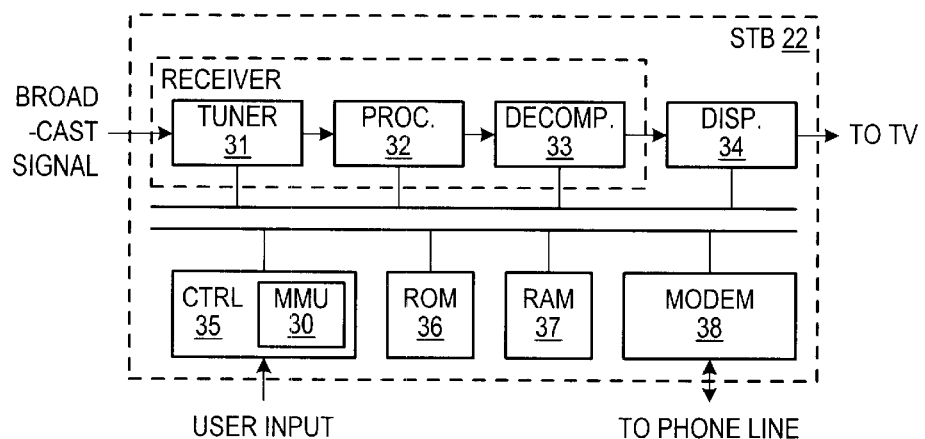
FIG. 2 is a block diagram of a set-top box used in one embodiment of the invention.

Referring to FIG. 2, a block diagram of a set-top box 22 is shown. The broadcast signal is received and fed into tuner 31. Tuner 31 selects the channel on which the broadcast audio-video-interactive signal is transmitted and passes the signal to processing unit 32. (Tuner 31 may be replaced by other means, all collectively referred to herein as input ports, for receiving signals from various signal sources.) Processing unit 32 demultiplexes the packets from the broadcast signal if necessary and reconstructs the television programs and/or interactive applications embodied in the signal. The programs and applications are then decompressed by decompression unit 33. The audio and video information associated with the television programs embodied in the signal is then conveyed to display unit 34, which may perform further processing and conversion of the information into a suitable television format, such as NTSC or HDTV audio/video. Applications reconstructed from the broadcast signal are routed to random access memory (RAM) 37 and are executed by control system 35. Module manager unit 30 is contained within control system 35. In one embodiment, module manager unit 30 is implemented in software, but it may also be implemented in hardware or a combination of hardware and software.

Control system 35 may include a microprocessor, microcontroller, digital signal processor (DSP), or some other type of software instruction processing device. RAM 37 may include memory units which are static (e.g., SRAM), dynamic (e.g., DRAM), volatile or non-volatile (e.g., FLASH), as required to support the functions of the set-top box. When power is applied to the set-top box, control system 35 executes operating system code which is stored in ROM 36. The operating system code executes continuously while the set-top box is powered in the same manner the operating system code of a typical personal computer (PC) and enables the set-top box to act on control information and execute interactive and other applications. The set-top box also includes modem 38. Modem 38 provides both a return path by which viewer data can be transmitted to the broadcast station and an alternate path by which the broadcast station can transmit data to the set-top box.

Although the term "set-top box" is used herein, it is understood that this term refers to any receiver or processing unit for receiving and processing a transmitted signal and conveying the processed signal to a television or other monitor. The set-top box may be in a housing which physically sits on top of a television, it may be in some other location external to the television (e.g., on the side or back of the television or remotely located from the television), or it may be incorporated into the television itself. Set-top box 22 serves to demodulate the signal received from broadcast station 10 and to separate the components of the signal, such as different television programs and interactive applications. Similarly, television 23 may be a television or a video monitor employing any suitable television format (e.g., NTSC or HDTV), or it may be replaced by other devices, such as a video recorder.

The receiving station is operatively connected to the broadcast station by a broadcast channel. This broadcast channel could utilize various transmission media and is contemplated to include media such as coaxial cable and free space (e.g., as used for direct satellite transmissions.) The broadcast channel forms a transmission path between the broadcast station and the receiving station. The broadcast station and receiving station are also connected by a return path. The return path typically consists of a pair of modems, one in the receiving station and one in the broadcast station, each connected to a standard telephone line. Other means for establishing a return path, e.g., using a portion of the bandwidth of the transmission path, are also contemplated.

Figure 3:
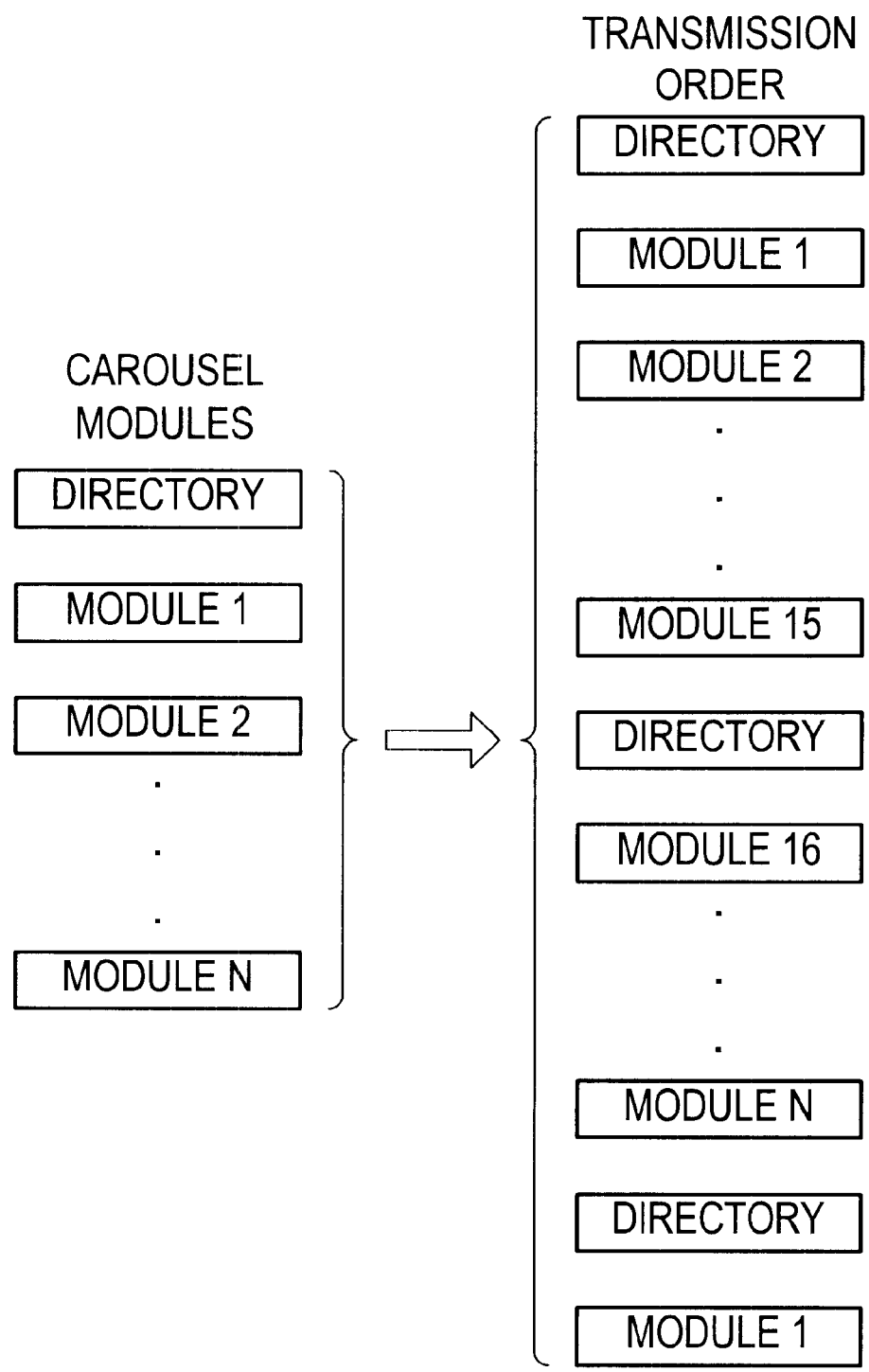
FIG. 3 is an illustration of the component modules of a carousel and the transmission order of the modules in one embodiment of the invention.

Referring to FIG. 3, an application (and in fact, any carousel) consists of a series of modules, one of which is a directory module. The directory module has a unique identifier so that it can be identified during transmission without further information. The directory module contains an entry for each of the modules in the application and any module which does not have a corresponding entry in the directory module is not recognized by the application. The directory module contains enough information to allow the interactive television receiver to access all of the parts (i.e., modules) of the application which may be necessary for execution of the program. The directory module must be accessed before the other modules of the application so that the remainder of the modules can be properly interpreted. The directory module may be transmitted several times during the cycle in which the modules of the application are transmitted in order to ensure that it is available for essentially random access to the other modules.

The directory modules of all the applications have a common format. The format consists of three parts: a portion having fixed-length components; a portion having variable-length components; and a portion having certification information. The fixed-length portion contains data on the application and each of the modules in the application.

The variable-length portion contains string data on the module names and the hash of the modules. The certification portion contains the producer certificate and directory signature.

In one embodiment, an application includes at least one module which is downloaded and executed automatically. Other modules containing data or additional code may not be needed immediately, so they may be downloaded after execution of the application begins. The downloading of these modules may be subject to timing constraints, however, so the interactive television system is configured to take these constraints into account and deliver the modules in a timely manner. If necessary, one of these modules may be multiplexed with other modules or data to be sure it is received when needed.

Figure 4:
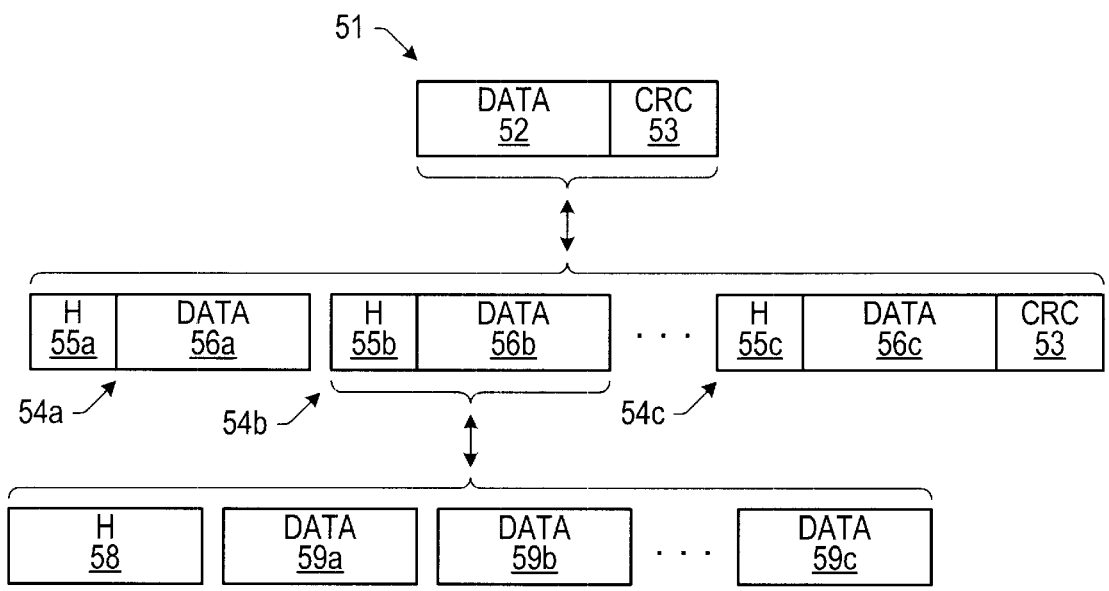
FIG. 4 is a block diagram illustrating the manner in which the data comprising a module is packetized in one embodiment of the invention.

Referring to FIG. 4, each of the modules 51 has a data segment 52 and a CRC segment 53. The data segment 52 of the directory module is described above. The data segment 52 of the remainder of the modules can contain any type of data, such as application code or raw data. The CRC segment 53 of each of the modules is used for error control and is computed for the entire module 51. Each of the modules 51 has a unique identifier.

Before the modules 51 are transmitted, they are formatted into transmission units 54. For the purposes of discussion, items referenced by the same number but different letters (e.g., 54a, 54b, 54c) will be collectively referred to by the number only (e.g., 54). Each of the transmission units 54 contains header information 55, which uniquely identifies that transmission unit 54 within the stream of transmission units, and data 56 which comprises a portion of the module being transmitted. The header 55 contains information such as the module ID, module offset and size, which allow the transmission units 54 to be reconstructed into a complete module 51. The transmission units 54 comprising a particular module 51 may be interleaved with other transmission units 54 in the transmission stream. The last transmission unit 54 for a module 51 carries the CRC 53.

The format of the transmission units 54 is dependent upon the transmission medium, but typically employs a series of packets of fixed length (the last packet may be padded to obtain the proper length.) The first packet 58 in the series carries the header information for the transmission unit 54. This header packet 58 is a special packet which can generate an interrupt in the CPU and which contains information to enable the CPU to determine whether the module 51 should be decoded and where it should be loaded into memory. The header packet 58 in a direct satellite transmission utilizes an auxiliary type packet which can generate an interrupt. The remainder of the packets 58 in a direct satellite transmission utilize a basic type packet which simply carries the transmission unit data.

The audio-video-interactive transmission from the broadcast station to the interactive television receiver comprises a series of transmission units. The transmission units which form a given module are typically time multiplexed with other information. This information may consist of transmission units of another module or compressed audio or video. The transmission units which are received by the interactive television receiver are reconstructed into their respective application modules.

Figure 5:
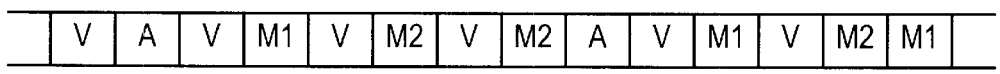
FIG. 5 is a diagrammatic representation of the signal transmitted from the broadcast station to a receiving station in one embodiment of the invention.

Referring to FIG. 5, a diagrammatic representation of the signal transmitted from broadcast station 10 to receiving station 20 is shown. The packets of several program sources are multiplexed into a single transmission stream if necessary. These packets may contain data for various applications or television programs. The illustrated transmission stream includes audio (A) and video (V) packets of a television program, as well as packets of two interactive application modules (M1, M2.) The packets are formatted as explained above to enable reconstruction of the packets into the respective programs and modules. It should be noted that several modules can be simultaneously transmitted by combining their packets in the transmission signal. The figure illustrates the time multiplexing of the packets of the modules and the television program. The modules need not belong to the same carousel to be transmitted together. It can be seen from the figure that there are typically more packets of video data for a particular television program than audio data for that program as a result of the greater amount of video data which typically must be transmitted.

The broadcast signal is received by set-top box 22, which demultiplexes the packets and reconstructs the respective television programs and modules. As explained above, the modules are stored in RAM 37, where they are available for use by applications executing in the control system 35. The set-top box may employ a security mechanism to ensure that the carousels and/or particular modules which are being downloaded are authentic. A certificate system may be used to ensure that the modules are produced by authorized producers and that the modules have not been altered before being received by the set-top box.

A certificate is a collection of information which typically identifies a module and can be taken as proof of the module's authenticity and integrity. The certificate may use "public key" encryption for this purpose. There are various encryption algorithms which may be employed by public key encryption systems. One embodiment uses RSA (Rivest, Shamir & Adleman) and DES (Data Encryption Standard) algorithms. Public key encryption utilizes a pair of encryption keys, one of which is termed a private key and one of which is called a public key. The private key is kept secret by its owner, while the public key is made freely available. A message or other file which is encrypted with the public key can only be decrypted with the private key. Likewise, a file which is encrypted with the private key can only be decrypted with the public key. Thus, when a public-key encrypted message is sent to the owner, the sender can be assured that, even if the message is intercepted, only the owner (who holds the private key) can decrypt it and read the message.

The set-top box maintains copies of the public keys of one or more trusted parties. When the set-top box receives a directory module, it checks the module for a certificate signed with the private key of the producer. The certificate contains a producer's certificate, which is the producer's public key, signed by a trusted party. The set-top box, having a copy of the trusted party's public key, can verify that the producer's certificate (the producer's public key) is authentic. Then, the producer's authenticated public key can be used to verify that the certificate is unaltered. The security mechanism may also include performing a hash function over the modules and including the hash value in the corresponding directory module or the like. Credentialing or other security in the directory module is typically implemented after the insertion of the other modules' hash values with their entries in the directory module.

Figure 6:
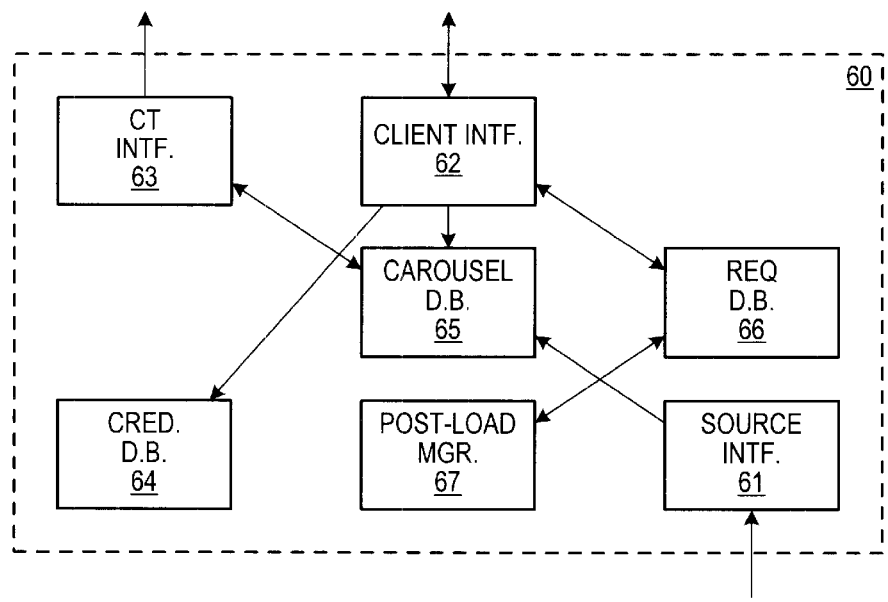
FIG. 6 is a block diagram illustrating the organization of one embodiment of the invention.

The module manager controls delivery, access and other functions which relate to the modules. Referring to FIG. 6, a block diagram illustrating the organization of one embodiment of the module manager 60 is shown. Module manager 10 includes a series of interfaces 61–63, a series of databases 64–66 and a post-load manager 67. The interfaces are source interface 61, client interface 62 and control task interface 63. The databases include, credential database 64, carousel database 65 and request database 66.

Source interface 61 manages requests from module sources. Source interface 61 is a series of unidirectional channels from the module sources to module manager 60. Source interface 61 includes a mechanism for requesting a buffer which can be used to store a module received from one of the module sources.

Client interface 62 handles client requests. Client interface 62 maintains a client database which consists of a linked list of client entries. Each entry in the client database has a pointer to the next entry, a client ID, client notification data and reference data.

Credential database 64 contains information on the producers of various carousels and the credentials associated with the producers. Credential database 64 is implemented as a linked list of producer entries, each entry having an ID for a given producer, a pointer to the next producer entry and a pointer to a first credential in a linked list of credentials for the given producer. The credentials in the linked list for each producer are verified before the credentials are entered in the database, so the signature and credential flags are removed before the credentials are stored. Each credential entry includes a pointer to the next credential entry, IDs for the carousels granting and being granted access, an expiration date and various flags. Accesses to credential database 64 may include adding, removing or finding specific entries, and removing groups of entries which are old or non-global.

Carousel database 65 contains information regarding carousels of which module manager 60 is aware. Carousel database 65 is implemented as a linked list of carousel entries. Each entry includes a carousel ID, various flags and pointers and a reference counter. The pointers indicate the locations of the directory module for the corresponding carousel and a list of associated requests in the request database. Carousel database 65 can be accessed by finding, adding or deleting entries, and by reading or manipulating data within the entries. Some of the carousel database access routines also manipulate things other than carousel database 65. For example, if the buffer in which the directory module should be loaded is requested, but no such buffer is assigned, a temporary buffer will be allocated.

Request database 66 contains information on pending requests for various modules. Request database 66 is implemented as a set of linked lists, each of which is associated with a corresponding carousel. As pointed out above, each entry in carousel database 65 has a pointer to a corresponding linked list of associated requests in request database 66. Each entry is also recorded in a hash table in order to reduce the amount of time which may be required to search for particular entries. Each entry in request database 66 has a pointer to the next entry, IDs for the requested module and its carousel, various flags and state and buffer information. Each entry stores a pointer to a buffer in which the requested module is to be stored, as well as the size of the buffer. Request database 66 may include a temporary storage allocation component which allows the request database to receive modules which have not been requested or for which buffers have not been allocated. Because the temporary storage allocation component of the database may not be optimized to efficiently store these modules, they should be moved to more permanent storage as soon as possible. Request database 16 implements functions to find, add, delete or read entries as well as to update the state of the requests as described below.

Figure 7:
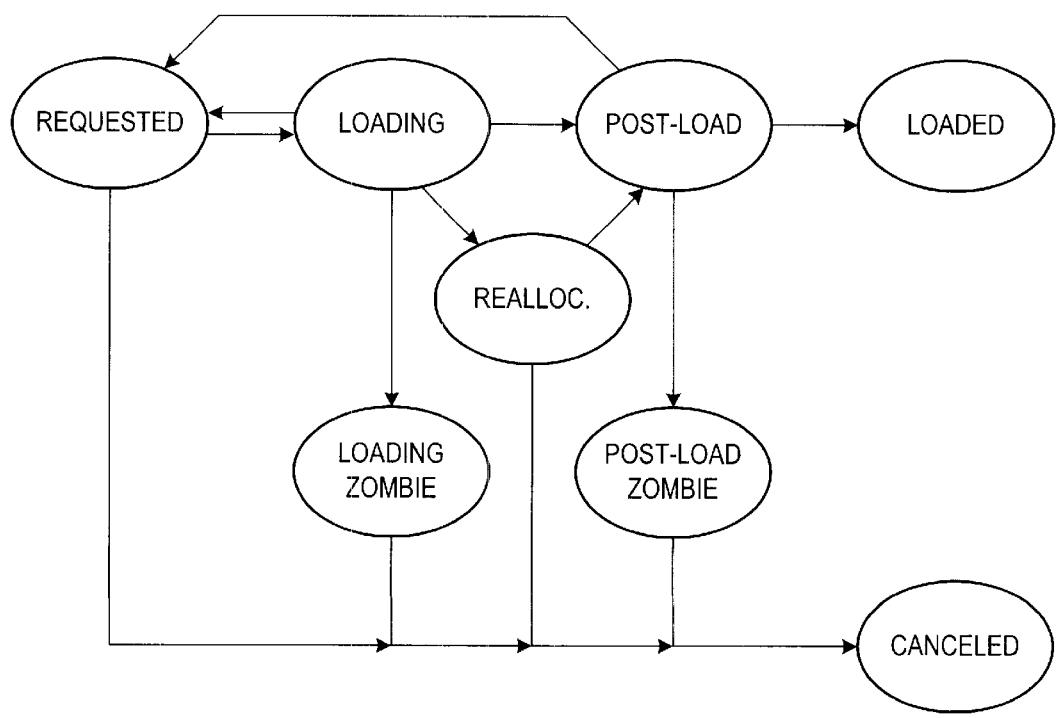
FIG. 7 is a state diagram illustrating the handling of module requests in one embodiment of the invention.

Each request entry includes a value indicating the state of the request. This value corresponds to one of the states shown in the state diagram of FIG. 7. The states include: requested; loading; loading zombie; reallocate; post-load; post-load zombie; loaded; and canceled. When a module is requested, but before it arrives from a module source, the request is in the "requested" state. If the request is canceled, the state changes from "requested" to "canceled." If the requested module begins to arrive at the module manager from a module source, the state changes from "requested" to "loading." (If a module arrives without first being requested, it may go directly to the "loading" state.) From the "loading" state, the request can move to the "requested," "post-load," "reallocate" or "loading zombie" states. If the loading of the module failed, but should be re-attempted, the state reverts to "requested." If the loading is canceled, the request changes to "loading zombie" while the buffer is still in use by the module source, then to "canceled." If the module finishes loading, the state transitions to "post-load" (if the buffer was not temporary) or "reallocate" (if the buffer was temporary.) If the request is in the "reallocate" state, it changes to "post-load" when the requested module is moved to permanent storage. The request remains in the "post-load" state while the requested module is processed into its final form. If the request is canceled while it is in "post-load," the state changes to "post-load zombie" until the processing of the module is complete, then to "canceled." Otherwise, when the processing of the requested module is complete, the request goes to the "loaded" state.

The module management unit monitors the various module sources coupled to the set-top box. As described above, the module sources may include broadcast signals, http signals, modem communications or other means for supplying input signals to the set-top box. (The term "module source" as used herein is broadly interpreted to include both transmission sources, such as satellite or modem transmissions, and inputs to the module management unit which carry processed, e.g., reconstructed and decompressed, signals.)

At start-up, the module management unit idles while waiting for a packet at one of the module sources. The broadcast station may transmit modules for which the module management unit is waiting on one of the module sources. The selection of a channel or module source to transmit a given module may be dependent upon the efficiency of the selected channel. For example, a module which is needed by many of the subscribing receivers might be transmitted over a broadcast channel, while a module which has a lower demand might be transmitted over a modem line. Because the module management unit monitors all of its module sources, a requested module may be received via any of the sources.

When a module is detected, the module management unit begins loading the module into memory. Once a module is completely loaded, it is entered in a list of stored modules. It is then tested to determine whether it is a directory module. If the module is a directory module, the module management unit authenticates the module's producer certificate. The module management unit may be programmed to take any of several actions if the certificate is not authentic, such as simply discarding the module, warning the user, or shutting down the set-top box. If the certificate is authentic, the module may be checked to verify its integrity according to the security mechanisms implemented in the system. If it is determined that the module contains errors, it is discarded. If the module is error-free, it is made available to the system for use in downloading other modules and providing information about the modules for execution purposes.

After start up, the module management unit may download modules in response to requests or as a result of being listed in the directory module (collectively, "needed" modules.) Requests for particular modules are placed in a list of pending requests maintained by the module management unit. The module management unit waits, monitoring the module sources for packets corresponding to the needed modules. The packets are detected and separated from the incoming stream of packets in the manner described above for the directory module. The module management unit may retrieve packets of more than one module at a time if they are interspersed. When receipt of all the packets for a module is finished, the module is reconstructed. The module may be tested for errors and its authenticity may be verified if the appropriate error-checking and security mechanisms have been implemented. If the completed module corresponds to a pending request, the module is matched to that request (i.e., the request is canceled and the module is made available to the application or module which initiated the request.) When the module management unit completes downloading of the needed modules which were available at the module sources, it resumes waiting for the next needed module.

In one embodiment, the module management unit is implemented in software executing in the control system. The module management unit may alternatively be implemented in hardware or a combination of hardware and software as a matter of design choice. Likewise, the particular broadcast medium and other details of the particular embodiments described above may be modified without departing from the spirit and scope of the invention as defined by the appended claims. The embodiments described above are intended to be exemplary rather than limiting, and it is contemplated that the scope of the invention includes various modifications and embodiments which will be apparent to those skilled in the art of the invention.

What is claimed is:

1. An interactive television receiver for retrieving modules for an interactive television application, the receiver comprising:

a first input port configured to receive a broadcast interactive television signal, said broadcast signal containing audio-video information corresponding to a television program;

a second input port configured to receive a second signal;

a microprocessor coupled to said first input port and said second input port, said microprocessor being configured to store one or more requests for corresponding ones of said modules, to monitor said broadcast signal received by said first input port and said second signal received by said second input port for said corresponding ones of said modules, to retrieve said corresponding ones of said modules from said broadcast signal and said second signal, and to store said corresponding ones of said modules; and a data storage device coupled to said microprocessor and configured to store said requests and said corresponding ones of said modules.

2. The interactive television receiver of claim 1 wherein said broadcast interactive television signal contains one or more auto-loading modules and wherein said microprocessor is further configured to monitor said first input port for said auto-loading modules, to retrieve said auto-loading modules from said broadcast signal and to store said auto-loading modules.

3. The interactive television receiver of claim 2 wherein said microprocessor is further configured to discard ones of said modules which are non-requested and non-auto-loading.

4. The interactive television receiver of claim 1 wherein said second input port is a modem.

5. The interactive television receiver of claim 1 wherein said plurality of modules comprises one or more high-demand modules and one or more low-demand modules and wherein said high demand modules are contained in said broadcast signal and wherein said low-demand modules are contained in said second signal.

6. The interactive television receiver of claim 1 wherein said application modules form a first carousel having a directory module which lists the remainder of said application modules and wherein said microprocessor is configured to store requests for said remainder of said application modules.

7. A method, implemented in an interactive television system, for managing carousel modules requested by an interactive television application, the method comprising the steps of:

storing one or more requests, each said request corresponding to a carousel module which is currently unavailable to said interactive television application;

monitoring a plurality of input ports for said corresponding carousel modules;

detecting one of said corresponding carousel modules;

retrieving said one of said corresponding carousel modules;

storing said one of said corresponding carousel modules;

providing said one of said corresponding carousel modules to said interactive television application.

8. The method of claim 7 wherein one of said input ports is a broadcast signal receiver and wherein said step of monitoring comprises receiving with said broadcast signal receiver a broadcast signal containing a television program and said one of said corresponding carousel modules.

9. The method of claim 8 further comprising removing said request from said storage after said one of said corresponding carousel modules is retrieved.

10. The method of claim 8 wherein said step of retrieving said one of said corresponding carousel modules comprises separating said one of said corresponding carousel modules from said broadcast signal and loading said one of said corresponding carousel modules.

11. The method of claim 10 wherein said step of storing one or more requests comprises storing request data for each of said requests, said request data comprising a carousel module ID and a state value.

12. The method of claim 11 further comprising the step of updating said state value when said one of said carousel modules corresponding to said state value begins loading.

13. The method of claim 11 further comprising the step of updating said state value when said one of said carousel modules corresponding to said state value is provided to said interactive television application.

14. The method of claim 7 wherein said input ports comprises a broadcast signal receiver and a modem and wherein said step of monitoring comprises receiving at one of said input ports a broadcast signal containing a television program, receiving at one of said input ports a modem signal containing said one of said corresponding carousel modules and detecting said one of said corresponding carousel modules in said modem signal.

15. The method of claim 7 wherein said step of storing one or more requests comprises storing one or more requests for modules of said interactive television application and storing one or more requests for modules of a separate carousel.

16. The method of claim 7 further comprising the step of beginning execution of said interactive television application prior to said step of storing one or more requests.

17. An interactive television system configured to execute one or more interactive applications having a plurality carousel modules, the interactive television system comprising:

a broadcast station configured to propagate a broadcast signal containing a first portion of said plurality of carousel modules, said broadcast station further being configured to transmit a plurality of non-broadcast signals containing a second portion of said plurality of carousel modules a plurality of receivers configured to receive said broadcast signal, each said receiver being further configured to receive one of said non-broadcast signals, each said receiver being configured to execute a corresponding one of said one or more applications, each of said plurality of applications needing one or more of said carousel modules, each said receiver being configured to store requests for said needed modules, to monitor said broadcast signal and said one of said non-broadcast signals for said needed modules, to store said needed modules and to execute said corresponding application.

18. The interactive television system of claim 17 wherein said broadcast station is configured to combine said first portion of said plurality of carousel modules with television program data and wherein said receivers are configured to separate said first portion of said plurality of carousel modules from said television program data, said receivers being further configured to format said television program data for display on a television.

19. The interactive television system of claim 18 wherein said broadcast station propagates said broadcast signal via a satellite broadcast channel.

20. The interactive television system of claim 18 wherein said broadcast station propagates said non-broadcast signals via a plurality of modem channels.

* * * * *